(12) United States Patent
Masutani

(10) Patent No.: US 8,573,691 B2
(45) Date of Patent: Nov. 5, 2013

(54) VEHICLE SEAT

(75) Inventor: Eiji Masutani, Shioya-gun (JP)

(73) Assignee: TS Tech Co., Ltd., Asaka-Shi (JP)

( * ) Notice: Subject to any disclaimer, the term of this patent is extended or adjusted under 35 U.S.C. 154(b) by 751 days.

(21) Appl. No.: 12/160,877

(22) PCT Filed: Jan. 13, 2007

(86) PCT No.: PCT/JP2007/050361
§ 371 (c)(1),
(2), (4) Date: Oct. 12, 2010

(87) PCT Pub. No.: WO2007/080991
PCT Pub. Date: Jul. 19, 2007

(65) Prior Publication Data
US 2011/0121620 A1 May 26, 2011

(30) Foreign Application Priority Data

Jan. 13, 2006 (JP) .................................. 2006-006714

(51) Int. Cl.
*B60R 21/00* (2006.01)
(52) U.S. Cl.
USPC .................................. 297/216.15; 297/216.1
(58) Field of Classification Search
USPC ............ 297/216.15, 216.16, 216.18, 216.19, 297/216.1, 480; 296/68.1
See application file for complete search history.

(56) References Cited

U.S. PATENT DOCUMENTS

| | | | | |
|---|---|---|---|---|
| 4,738,485 A | * | 4/1988 | Rumpf | 297/216.19 |
| 5,366,269 A | * | 11/1994 | Beauvais | 297/216.19 |
| 5,462,333 A | * | 10/1995 | Beauvais | 297/216.11 |
| 6,050,635 A | * | 4/2000 | Pajon et al. | 297/216.1 |
| 6,076,887 A | * | 6/2000 | Andersson | 297/216.1 |
| 6,142,564 A | * | 11/2000 | Pajela et al. | 297/216.18 |
| 6,227,563 B1 | * | 5/2001 | Talisman | 280/735 |
| 6,302,481 B1 | * | 10/2001 | Swann et al. | 297/216.18 |
| 6,386,631 B1 | * | 5/2002 | Masuda et al. | 297/216.1 |
| 6,435,592 B2 | * | 8/2002 | Nilsson | 296/68.1 |
| 6,582,023 B2 | * | 6/2003 | Houston et al. | 297/470 |
| 6,629,575 B2 | * | 10/2003 | Nikolov | 180/282 |
| 6,648,409 B1 | * | 11/2003 | Laporte | 297/216.1 |
| 6,746,077 B2 | * | 6/2004 | Klukowski | 297/216.1 |
| 7,036,878 B2 | * | 5/2006 | Masutani | 297/216.1 |
| 7,229,133 B2 | * | 6/2007 | Maddelein et al. | 297/362.13 |
| 7,780,230 B2 | * | 8/2010 | Serber | 297/216.15 |
| 8,052,211 B2 | * | 11/2011 | Nilakantan | 297/216.12 |
| 8,109,568 B2 | * | 2/2012 | Masutani | 297/216.15 |

(Continued)

FOREIGN PATENT DOCUMENTS

| | | | | | |
|---|---|---|---|---|---|
| JP | 05286387 A | * | 11/1993 | | B60N 2/42 |
| JP | 2003081055 A | * | 3/2003 | | B60R 22/46 |

*Primary Examiner* — David E Allred
(74) *Attorney, Agent, or Firm* — Browdy and Neimark, PLLC

(57) ABSTRACT

The present vehicle seat includes a seat bottom 3 and a seat back 2 rotatably mounted to the seat bottom. The seat bottom includes a support frame 10 mounted to a vehicle body 7 and a bottom cushion 15 supported by a support frame. The support frame has a configuration not to move in a front-and-back direction with respect to the vehicle body by unfavorable external force that abruptly moves a seat occupant forward. The seat bottom has a configuration to be movable in the front-and-back direction with respect to the support frame. Between the bottom cushion and the support frame, a pretensioner 21 that moves the bottom cushion backward with respect to the support frame is located when the unfavorable external force occurs.

9 Claims, 5 Drawing Sheets

(56) References Cited

U.S. PATENT DOCUMENTS

| | | |
|---|---|---|
| 8,113,575 B2* | 2/2012 | Masutani .................. 297/216.1 |
| 8,434,819 B2* | 5/2013 | Guerrero .................. 297/216.16 |
| 2001/0011810 A1* | 8/2001 | Saiguchi et al. ........... 280/728.1 |
| 2002/0190515 A1* | 12/2002 | Birk et al. ..................... 280/753 |
| 2004/0051353 A1* | 3/2004 | Klukowski ................. 297/216.1 |
| 2005/0242634 A1* | 11/2005 | Serber ........................ 297/216.1 |
| 2010/0001559 A1* | 1/2010 | Masutani .................... 297/216.1 |
| 2011/0018316 A1* | 1/2011 | Meredith et al. ........... 297/216.1 |
| 2011/0089727 A1* | 4/2011 | Masutani .................... 297/216.1 |
| 2011/0121621 A1* | 5/2011 | Masutani .................... 297/216.1 |
| 2011/0156457 A1* | 6/2011 | Masutani .................... 297/216.1 |
| 2011/0210586 A1* | 9/2011 | Masutani .................... 297/216.1 |
| 2012/0112503 A1* | 5/2012 | Masutani .................... 297/216.1 |

* cited by examiner

VEHICLE SEAT

TECHNICAL FIELD

The present invention relates to a vehicle seat that can effectively protects a vehicle seat occupant when unfavorable external force that abruptly moves the seat occupant forward is exerted to a vehicle body, and more specifically, to a vehicle seat that quickly responds to generation of the unfavorable external force and moves a bottom cushion backward.

BACKGROUND ART

Conventionally, when unfavorable external force is exerted on a vehicle body, a technique to quickly move a vehicle seat (including a seat back and seat bottom) backward is disclosed in Patent Document 1.

Patent Document 1: JP 2001-130354A

DISCLOSURE OF THE INVENTION

The above-mentioned prior art has a problem in that both vehicle seat back and seat bottom move backward. To move both seat back and seat bottom, strength of a structure to be moved must be sufficiently secured and large force is required to move and a large space is required to move. Consequently, the prior art has a big disadvantage in weight and size, and the prior art is difficult to be equipped to a small vehicle in which a space is difficult to be secured.

In addition, the rear space of the vehicle seat must be reserved as a dead space to accommodate the vehicle seat in the event of an emergency, but if a seat occupant sits on a vehicle rear seat in contravention of this restriction, the occupant on the rear seat may be subject to secondary damage by the vehicle seat that moves backward in the event of an emergency.

Consequently, it is an object of the present invention to provide an improved type vehicle seat which surmounts the above-mentioned problem.

To achieve the object, in the present invention, when unfavorable external force is exerted on a vehicle body, the bottom cushion only moves backward without moving the seat back.

BEST MODE FOR CARRYING OUT THE INVENTION

Figure 1:
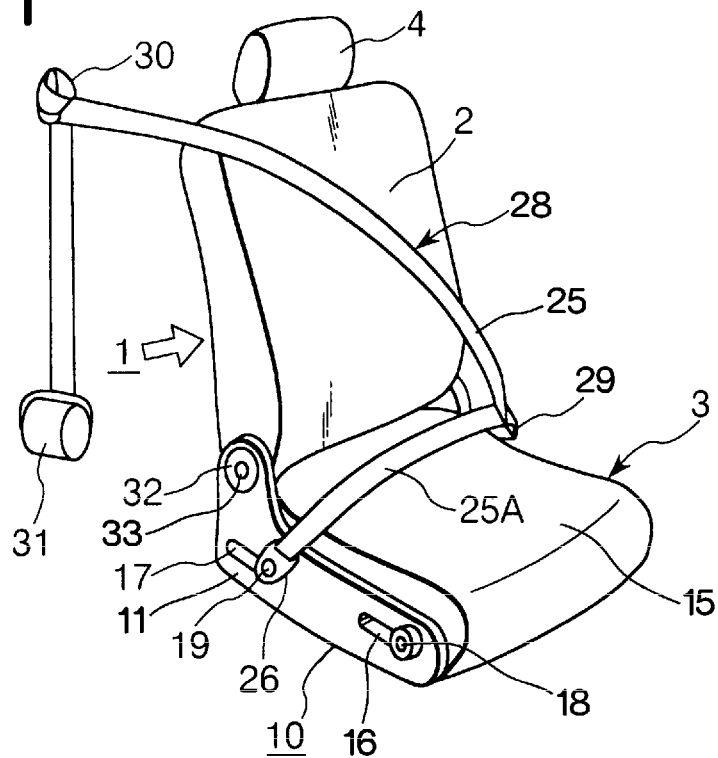
FIG. 1 is a perspective view showing the entire view of a vehicle seat according to the present invention.
Figure 2:
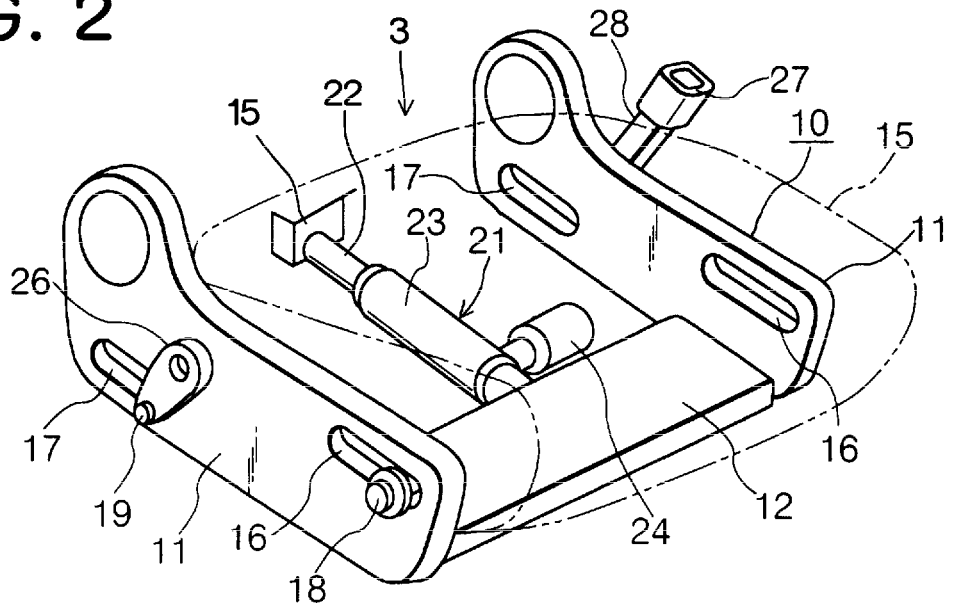
FIG. 2 is a perspective view showing a support frame of a seat bottom of the vehicle seat.
Figure 3:
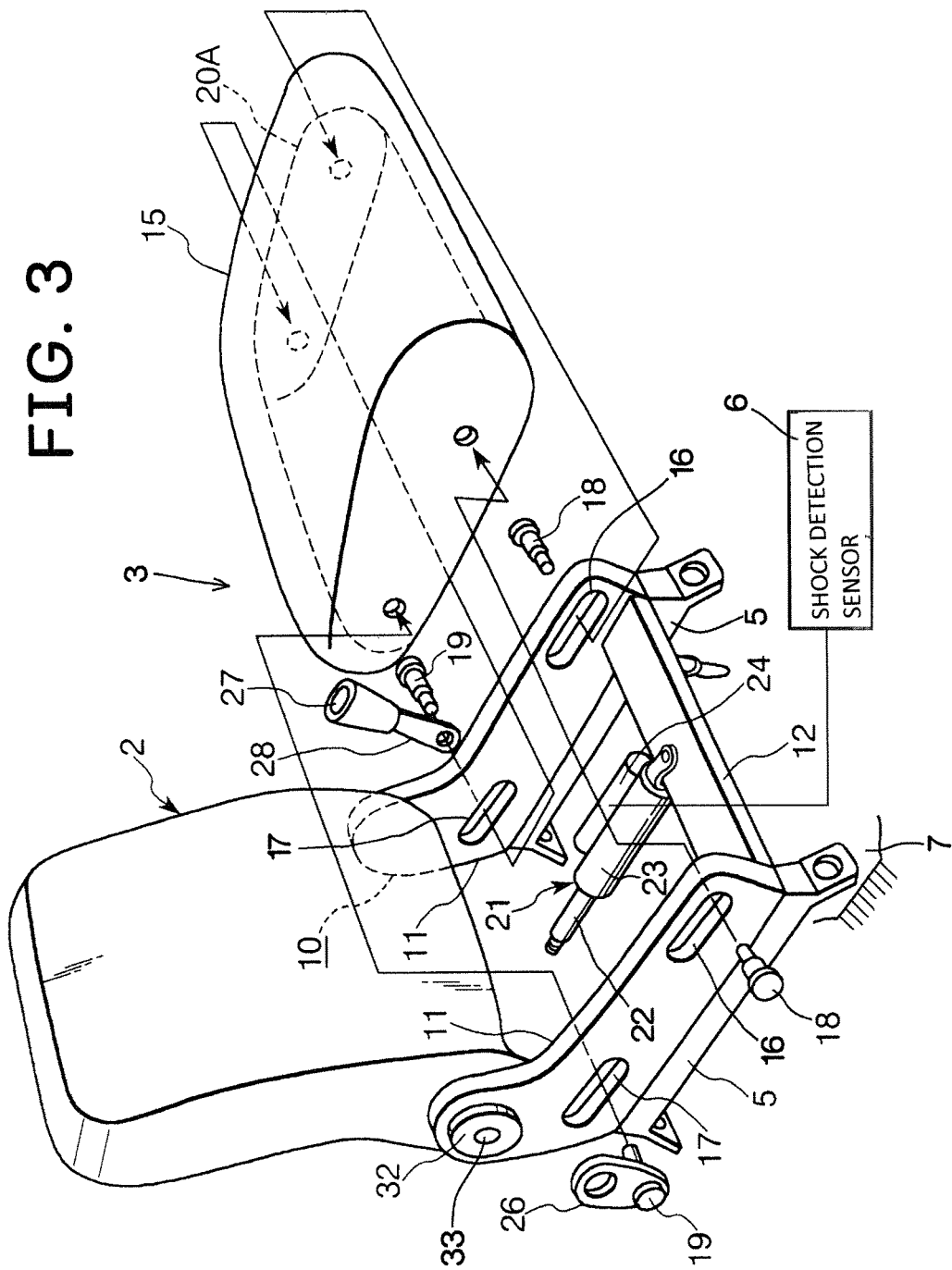
FIG. 3 is an exploded perspective view of the vehicle seat.
Figure 4:
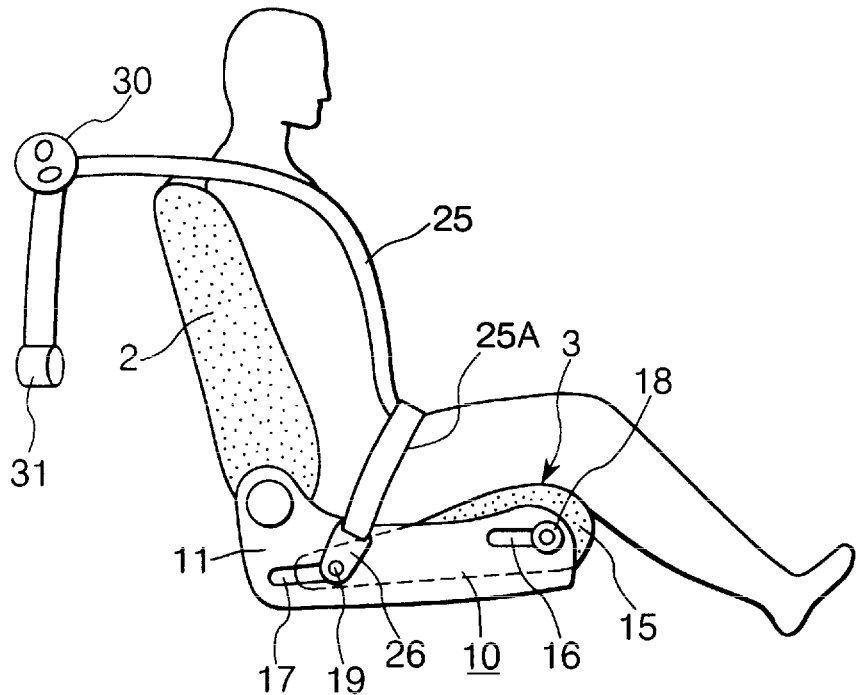
FIG. 4 is a side view showing the vehicle seat and a seat occupant in the normal condition.
Figure 5:
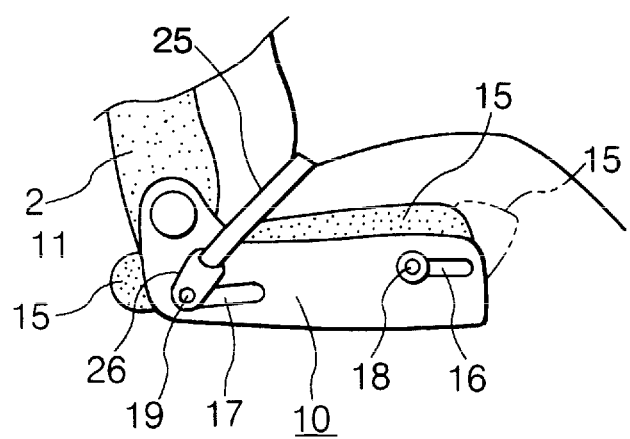
FIG. 5 is a side view showing the condition in which unfavorable external force is exerted to a vehicle body and a bottom cushion moves backward.
Figure 6:
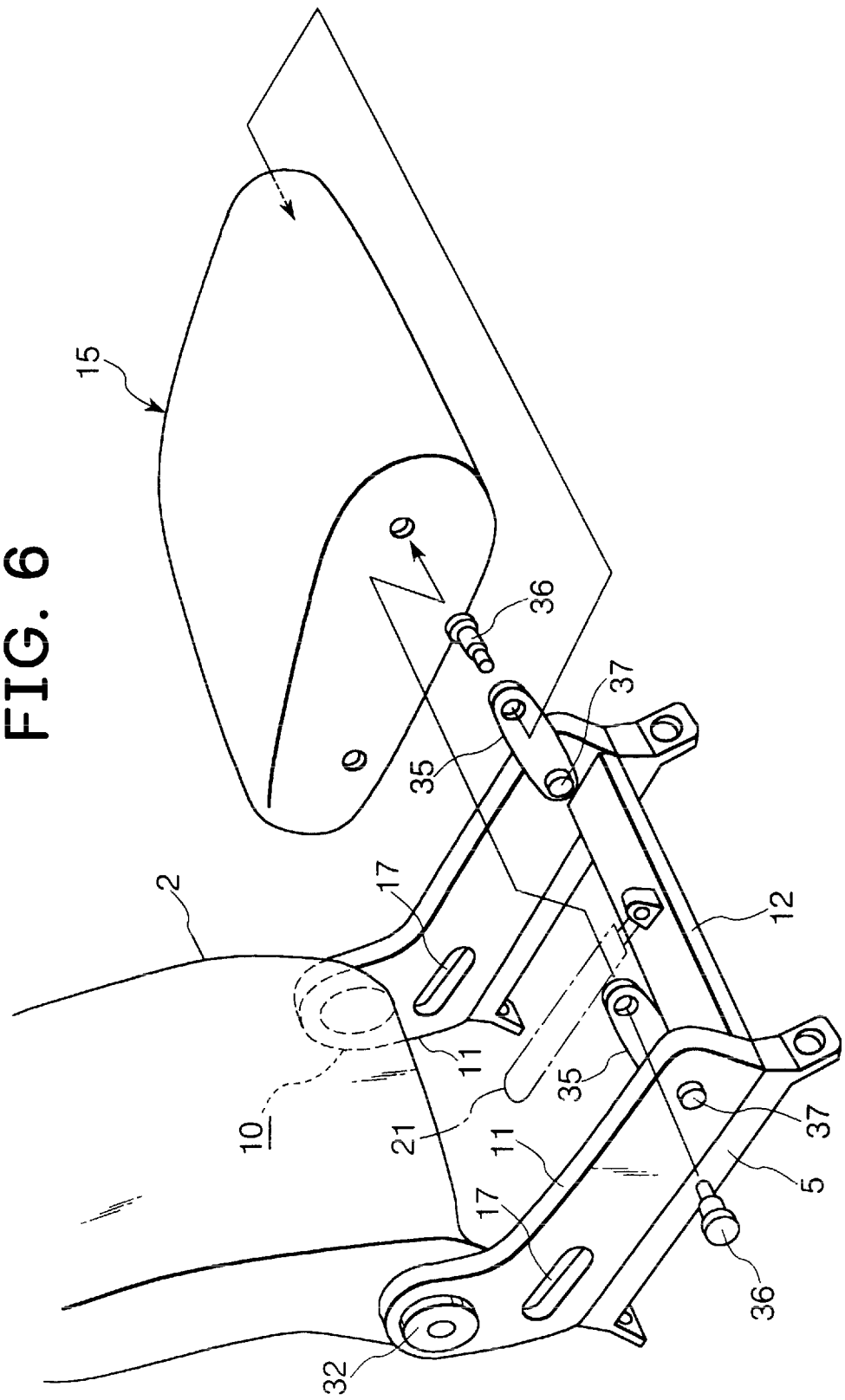
FIG. 6 is an exploded perspective view of the vehicle seat showing another embodiment that supports the bottom cushion.
Figure 7:
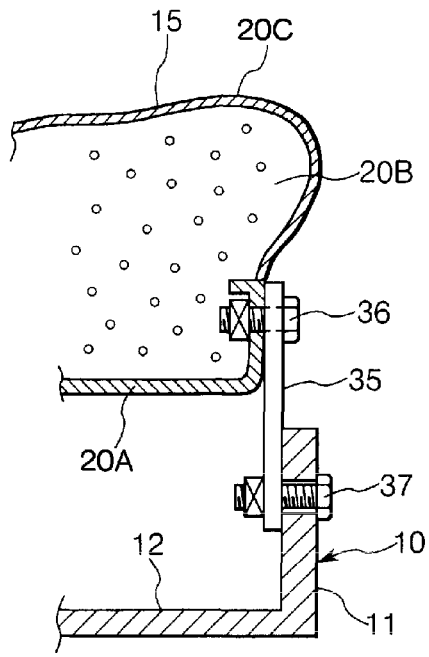
FIG. 7 is a cross-sectional view of a seat bottom of the vehicle seat.
Figure 8:
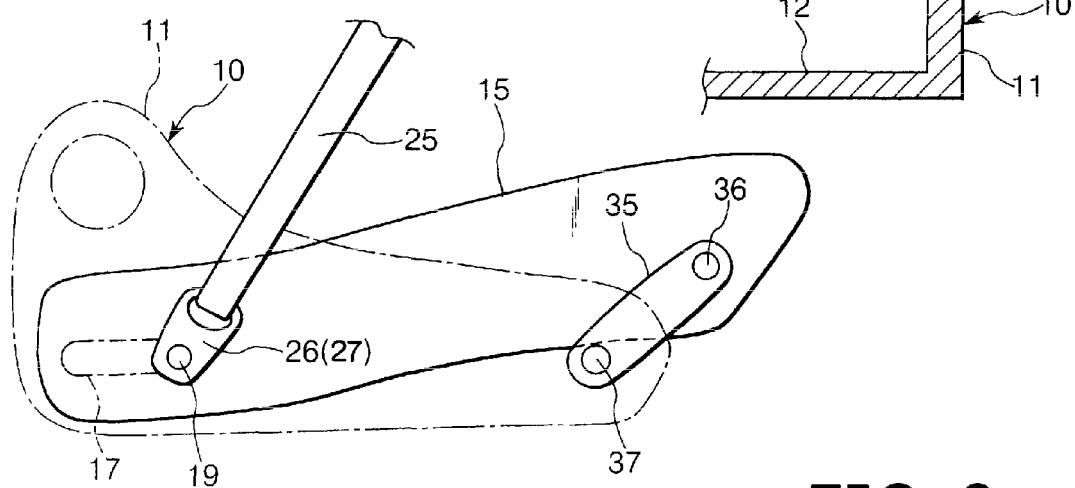
FIG. 8 is a side view showing the vehicle seat and a seat occupant under the normal condition.

Referring now to drawings, an embodiment of the present invention will be described as follows. A vehicle seat 1 according to the present invention has a seat bottom 3, a seat back 2 pivoted to the seat bottom 3 by a shaft 33, and a head rest 4 mounted to the upper part of the seat back 2. The seat back 2 is held to an optional angle with respect to the seat bottom 3 by a reclining mechanism 32. The seat bottom 3 has a support frame 10 and a bottom cushion 15, and the support frame 10 is mounted to a vehicle body 7 (FIG. 3) via a known slide mechanism 5.

The support frame 10 has a pair of vertical plates 11 and a coupling member 12 installed between the vertical plates 11. The bottom cushion 15 is substantially disposed between vertical plates 11 and 11. In the first embodiment shown in FIG. 1 through FIG. 5, to each vertical plate 11, a front-side slot 16 and a rear-side slot 17 extending in a front-and-back direction are provided. The bottom cushion 15 is movably supported in the front-and-back direction by a mounting shaft 18 inserted into the front-side slot 16 and a mounting shaft 19 inserted into the rear-side slot 17.

On the lower side of the bottom cushion 15, a pretensioner 21 that moves the bottom cushion 15 backward relatively with respect to the vehicle body 7 (support frame 10 or seat back 2) is disposed. The pretensioner 21 has a piston 22, a cylinder 23, and a gas generator 24 that supplies a large amount of gas into the cylinder 23. In the embodiment shown in FIGS. 2 and 3, the base portion of the cylinder 23 is mounted to the coupling member 12 of the support frame 10, and the head end of the piston 22 is mounted to the bottom cushion 15. When a shock detection sensor 6 detects shock (unfavorable external force that abruptly moves a seat occupant forward), the gas generator 24 instantaneously generates a large amount of gas to move the piston 22 from the cylinder 23 backward, and thereby the bottom cushion 15 is displaced backward relatively with respect to the support frame 10.

The vehicle seat 1 has a seat belt mechanism 28. The seat belt mechanism 28 has a belt retractor 31, a seat belt 25, a shoulder belt anchor 30 holding the intermediate portion of the seat belt 25 to a predetermined height, a tongue plate 29 coupled to the middle of the seat belt 25, a tongue anchor 27 with which the tongue plate 29 is removably engaged, and a tip anchor 26 to which the head end of the seat belt 25 is fixed. The retractor 31 restricts pullout of the seat belt 25 when a strong load is exerted to the seat belt 25 due to an accident or the like. The retractor 31 is fixed to the vehicle body 7 or the seat back 2. The tip anchor 26 and the tongue anchor 27 are mounted to the support frame 10 with the rear-side mounting shafts 19 and 19, respectively.

When the bottom cushion 15 moves backward by action of the pretensioner 21, the mounting shaft 19 attached to the bottom cushion 15 moves backward within the rear-side slot 17. Consequently, a lap belt 25A of the seat belt 25 moves backward together with the mounting shaft 19 (bottom cushion 15) and no unfavorable space is generated between the lap belt 25A and the seat occupant when the bottom cushion 15 moves backward.

Figure 9:
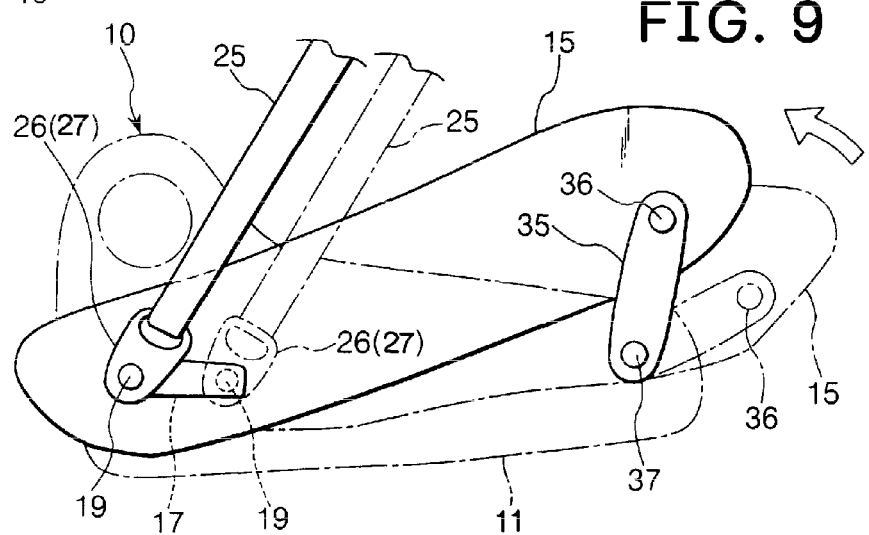
FIG. 9 is a side view showing the condition in which unfavorable external force is exerted on a vehicle body and the bottom cushion moves backward.

In addition, FIG. 6 through FIG. 9 show another embodiment of the mechanism that supports the bottom cushion 15. On the front portion of the vertical plate 11 of the support frame 10, a link arm 35 is rotatably mounted by a shaft 37, and to the head end of the link arm 35, the front portion of the bottom cushion 15 is attached. By this, when the piston 22 of the pretensioner 21 moves backward, the front portion of the bottom cushion 15 moves toward upper back side as shown in FIG. 9 from the state of FIG. 8.

The bottom cushion 15 has a cushion frame 20A, a cushioning material 20B mounted to the cushion frame 20A, and a cover 20C enveloping the circumference of the cushioning material 20B.

When unfavorable external force that abruptly moves the seat occupant forward by an accident or the like is applied to the vehicle body 7 while the vehicle is moving, the retractor 31 locks the seat belt 25 and restricts forward movement of the seat occupant by the seat belt 25.

However, since protection of the seat occupant by the seat belt 25 is conducted behind the occurrence of an accident or the like, the seat occupant protected by the seat belt 25 alone is generally moved forward comparatively greatly by the unfavorable external force.

Consequently, in the present application, when the shock detection sensor 6 detects any unfavorable external force, the shock detection sensor 6 instantaneously operates the pretensioner 21 and moves the bottom cushion 15 of the seat bottom 3 backward relatively with respect to the vehicle body (support frame 10 or seat back 2). In such event, the tip anchor 26 and the tongue anchor 27 are linked to the bottom cushion 15 by the rear-side mounting shafts 19 and 19 in such a manner that they are not moved in the front-and-back direction relative to the bottom cushion 15, and the rear-side mounting shafts 19 and 19 are movably mounted to the support frame 10 in the front-and-back direction. Thus, the lap belt 25A moves backward together with the bottom cushion 15. Consequently, the seat occupant is protected by the seat belt 25, in particular, by the lap belt 25A without greatly getting behind the occurrence of unfavorable external force, and forward movement of the seat occupant is dramatically decreased from before. Consequently, damage brought to the seat occupant by occurrence of unfavorable external force is dramatically alleviated.

Furthermore, in the present invention, of the vehicle seat 1, the bottom cushion 15 only practically moves backward. Consequently, even in a vehicle that cannot secure a large moving space at the back of the vehicle seat 1, the outstanding function of the present invention is able to be equipped. In other words, in the present invention, a dead space is scarcely generated at the back of the vehicle seat 1.

In addition, in the embodiment of FIG. 6 through FIG. 9, when unfavorable external force is generated, the backside of the bottom cushion 15 moves backward nearly horizontally as is the case of the first embodiment, but the front side of the bottom cushion 15 is guided above backward by the link arm 35. And by allowing the front side of the bottom cushion 15 to move upward, the forward movement of a seat occupant is still more restricted.

The invention claimed is:

1. A vehicle seat comprising:
a seat bottom;
a seat back mounted rotatably to the seat bottom;
said seat bottom including a support frame to be mounted to a vehicle body and a bottom cushion supported by the support frame, the support frame comprising two vertical plates and a coupling member connected between the two vertical plates, each of the two vertical plates having defined therein at least one slot extending lengthwise in a front to back direction, at least one mounting shaft directly connected to each of two opposite sides of the bottom cushion, wherein the mounting shaft on each side extends outwardly and is movably supported in the at least one slot of each of the two vertical plates;
said support frame having a configuration not to move in a front-and-back direction with respect to the vehicle body by unfavorable external force that abruptly moves a seat occupant forward;
said bottom cushion having a configuration to be movable in the longitudinal direction with respect to the support frame;
a pretensioner disposed between the bottom cushion and the support frame for moving the bottom cushion backward with respect to the support frame when the unfavorable external force is generated; and
a seat belt mechanism comprising a seat belt, a tongue plate coupled to the middle of the seat belt, a tongue anchor with which the tongue plate is removably engaged, and a tip anchor to which the head end of the seat belt is fixed, and wherein the tongue anchor and the tip anchor are directly connected to an outer end of the at least one mounting shaft on each side, respectively, so that the tongue anchor and the tip anchor move backward together with the bottom cushion responsive to the pretensioner.

2. The vehicle seat according to claim 1, wherein the seat belt mechanism further comprises a lap belt connected between the tongue anchor and the tip anchor so that the lap belt moves backward together with the bottom cushion when the unfavorable external force is generated.

3. The vehicle seat according to claim 1, wherein a rear portion of the bottom cushion moves backward nearly horizontally when the pretensioner is activated but a front portion of the bottom cushion moves backward while rising.

4. The vehicle seat according to claim 1, wherein the seat bottom is located between the vertical plates, and the pretensioner is disposed below the bottom cushion.

5. The vehicle seat according to claim 1, wherein the at least one slot has a straight shape, extending longitudinally with respect to the vertical plates.

6. The vehicle seat according to claim 1, wherein the at least one slot comprises a first slot defined in a rear position on each vertical plate adjacent the seat back and a second slot defined in a forward position on each vertical plate opposite from the rear position of the first slot.

7. The vehicle seat according to claim 6, wherein the at least one mounting shaft is supported in the first slot on each vertical plate.

8. The vehicle seat according to claim 6, wherein the at least one mounting shaft comprises a first mounting shaft supported in the first slot on each vertical plate and a second mounting shaft supported in the second slot on each vertical plate.

9. The vehicle seat according to claim 1, wherein the at least one slot comprises a slot defined in a rear position on each vertical plate adjacent the seat back, and the vehicle seat further comprises a link arm having a first end rotatably mounted to a forward position on the seat frame, and a second end rotatably mounted to the bottom cushion, so that when the tongue anchor and the tip anchor move backward together with the bottom cushion, the link arm pivots in an upward and rearward direction so that a front portion of the bottom cushion is pivoted upwardly with respect to the seat frame.

* * * * *